April 15, 1958     M. MAUL     2,830,532
RECORD CARD CONTROLLED PRINTING MACHINES
Filed Aug. 24, 1953     5 Sheets-Sheet 1

Inventor:
Michael Maul
BY:

Inventor:
Michael Maul

April 15, 1958 M. MAUL 2,830,532
RECORD CARD CONTROLLED PRINTING MACHINES
Filed Aug. 24, 1953 5 Sheets-Sheet 3

Inventor:
Michael Maul
BY

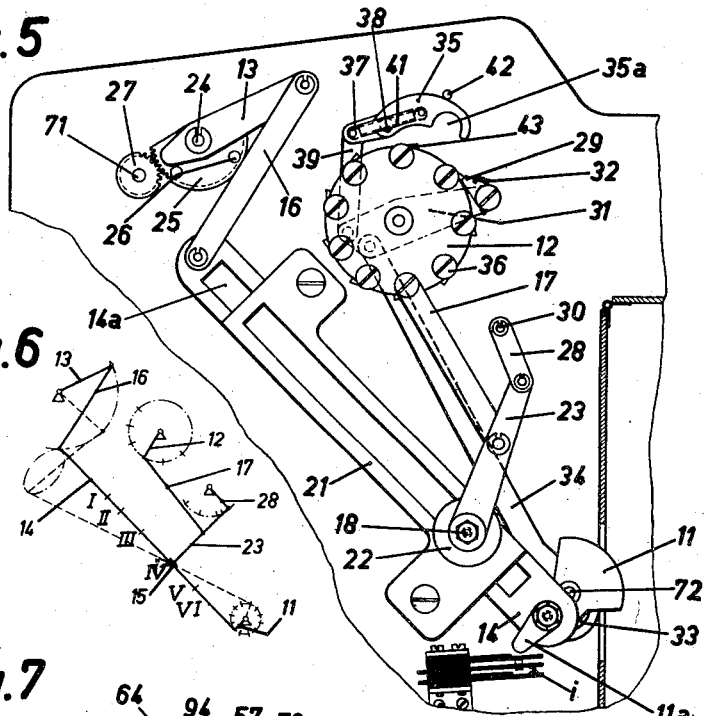

April 15, 1958   M. MAUL   2,830,532
RECORD CARD CONTROLLED PRINTING MACHINES
Filed Aug. 24, 1953   5 Sheets-Sheet 5
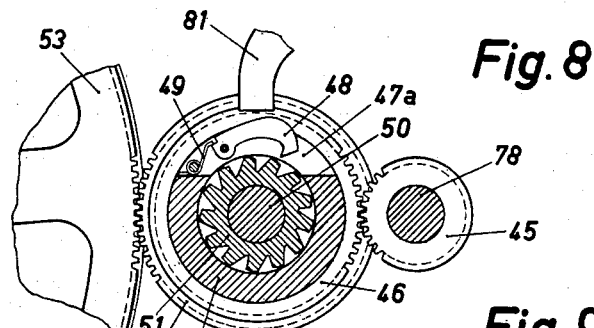
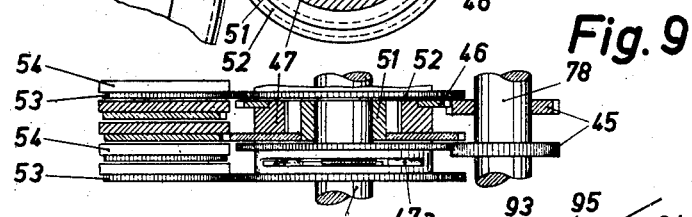
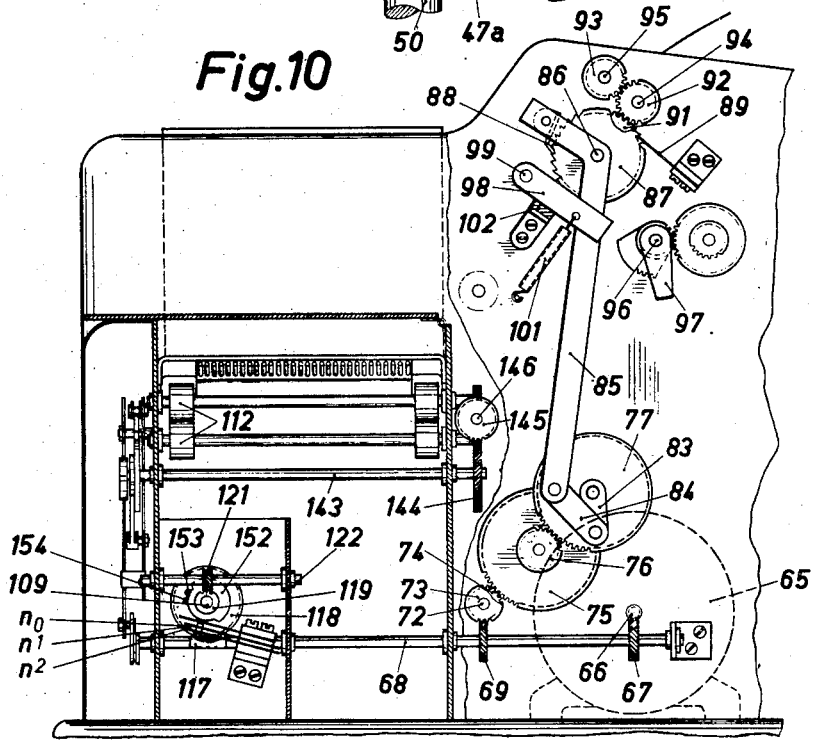
Inventor:
Michael Maul
BY:

2,830,532

RECORD CARD CONTROLLED PRINTING MACHINES

Michael Maul, Schwabach, near Nurnberg, Germany

Application August 24, 1953, Serial No. 375,919

Claims priority, application Germany September 9, 1952

9 Claims. (Cl. 101—93)

The present invention provides a card controlled printing mechanism which opens new possibilities in the field of record card controlled machines as they are particularly used for statistical and accounting purposes.

It is one of the main objects of the invention to provide a machine serving for the alternate printing of cards of two different kinds by a common printing mechanism.

Another object of the invention consists in that in a machine of the type referred to a printing mechanism is controlled by cards of two kinds, the cards of the one kind being groupwise sorted according to the designation marks and the control of the printing mechanism being carried out by a group control device for said designation marks. The group control device will interrupt, upon determination of a group change the feed of these cards and will initiate the feed for the cards of the other kind, the analyzing means for the same being simultaneously therewith connected to the common printing mechanism. After printing of a card or cards of the other kind again the feed for the cards and the actuation of the printing mechanism by the latter is effected.

In order to facilitate the explanation, the cards of the one kind shall hereinafter be generally termed principal or first cards and the cards of the other kind shall generally be termed associate or second cards. Particular advantages over the prior art are obtained if the principal cards are represented by item cards indicating by index marks certain items and the coordinated group designation; and if the associated cards are represented by total or summary cards having also a group designation, each indicating the total of a number of items of a group of item cards.

Upon application of the invention it is possible to enter new fields in the art of punched card machinery and to depart entirely from the usual tabulating machines which effect item and total printing of the groupwise sorted cards running through the machine under group control supervision. Due to the manifold coaction of adding and printing mechanism as well as of their associated controlling devices, the modern tabulating machines are not only very voluminous but also very complicated. Upon application of the machine according to the invention, however, a small and simple summary card punch may be used which requires no printing mechanism. For printing the items together with the totals, a table printer according to the present invention may be used which requires no accumulators. Therefore, each machine may operate with its optimal efficiency which cannot always be said about the known tabulating machines. For instance, if the latter are electronically controlled, the advantage of the high electronic speed cannot be utilized at all for item printing since the efficiency of the machine is determined by the printing speed. When the present invention is applied, there is no mutual dependency of the summary card punch and table printer and moreover the two separate machines are more reliable in operation than a tabulating machine having accumulator and printing mechanisms.

With the machine according to the invention the total or summary cards may be obtained separately but nevertheless they can control the machine together with the item cards in such way that a roster is obtained containing the items as well as the respective totals. Consequently, upon application of the machine according to the present invention, the groupwise sorted item cards may be deposited in the supply magazine, and the total cards corresponding to the groups of items and having been obtained separately in a summary card punch, may be deposited in the other supply magazine. The data of the item cards are printed one after the other. Upon group change, however, the item card advance is interrupted and the total card belonging to the respective group of item cards is printed. Subsequently again the item card feed is initiated and the data of the next item card group will be printed one after the other.

Although the main field of application of the present invention is to be seen in obtaining compilations composed of the data of the item and total cards, the invention is by no means restricted to such use. It rather may be applied in any instance where the cards of the one kind, termed before principal or first cards, are groupwise sorted, and where a special stack of cards of the other kind, termed before associate or second cards, corresponds to the groups of principal cards. In this instance for each group of principal cards there may be one or more cards in the stack of associate cards. Of course, the associate cards could just as well contain any constant data being associated with each group which data shall be printed once at the end or the beginning of a group, such as for instance a name or an address.

Further objects and advantages of the invention will be seen from the preferred embodiment of the invention described hereinafter in connection with the accompanying drawings.

Figure 4A:
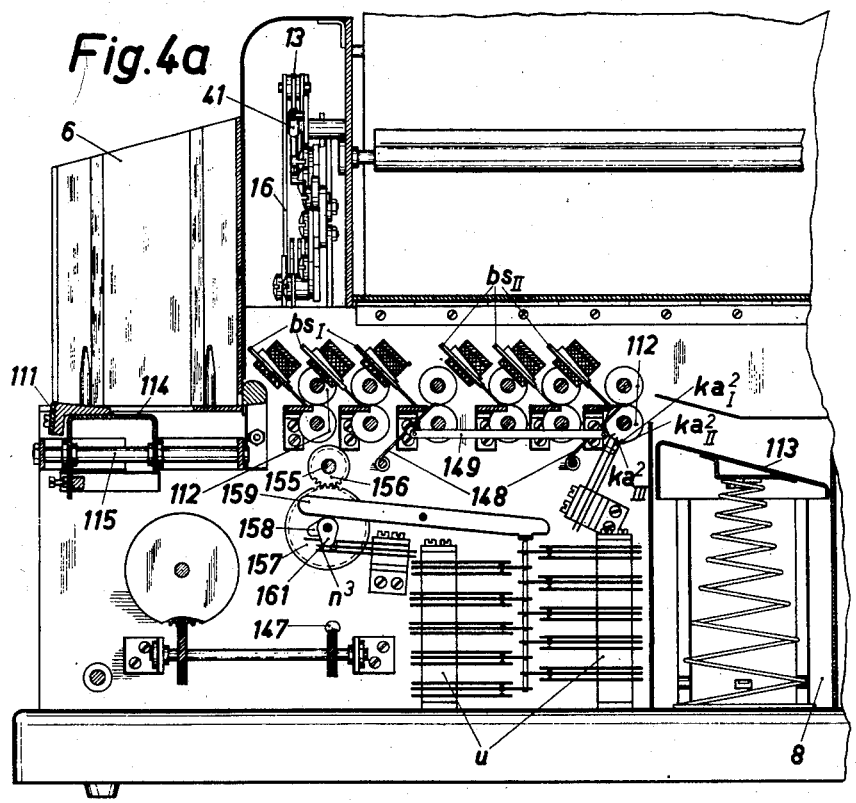
Figure 4B:
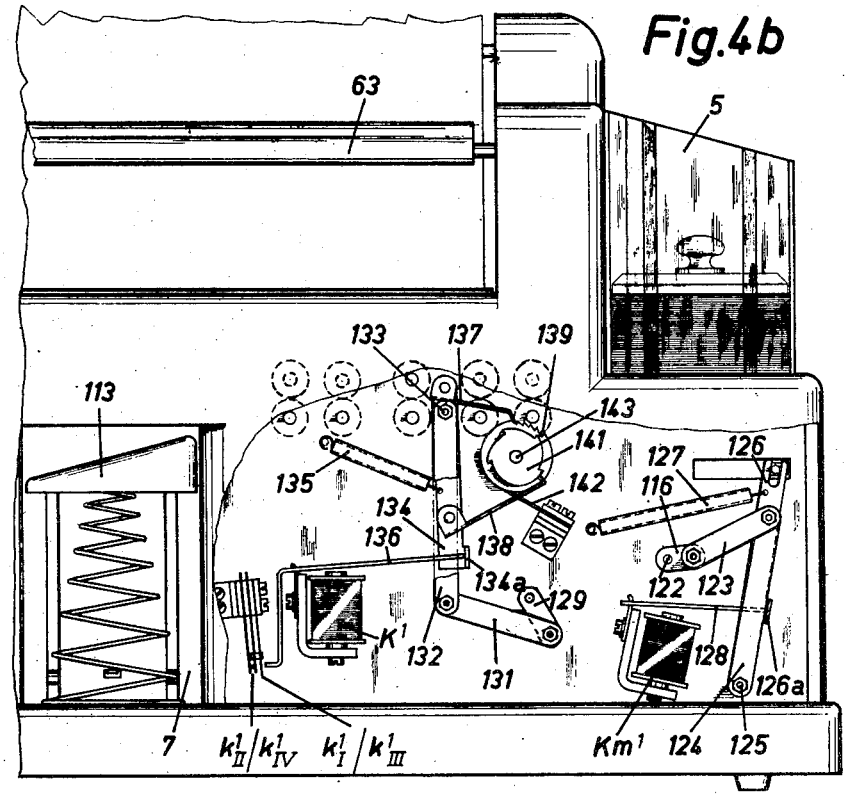

Figs. 4a and 4b must be put side by side and show the machine from the front side partially in section and in front view.

Fig. 5 shows the actual construction of the crank drive for the translation.

Fig. 6 shows an operating diagram of the crank drive.

Fig. 7 shows a cross section of the machine from which particularly the arrangement of the printing mechanism may be seen.

Fig. 8 shows the clutch system for the type wheels in a section transversely of the axis.

Fig. 9 shows the clutch system in section and view longitudinally of the axis.

Fig. 10 shows the machine from the right partly in section and in view with the cover being removed.

Figure 11A:
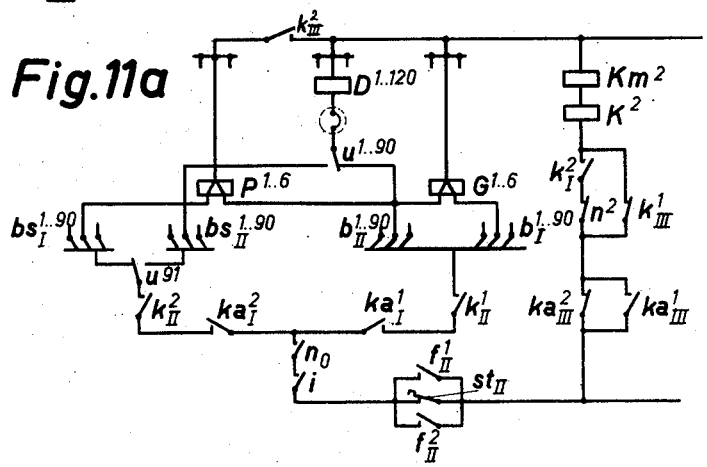
Figure 11B:
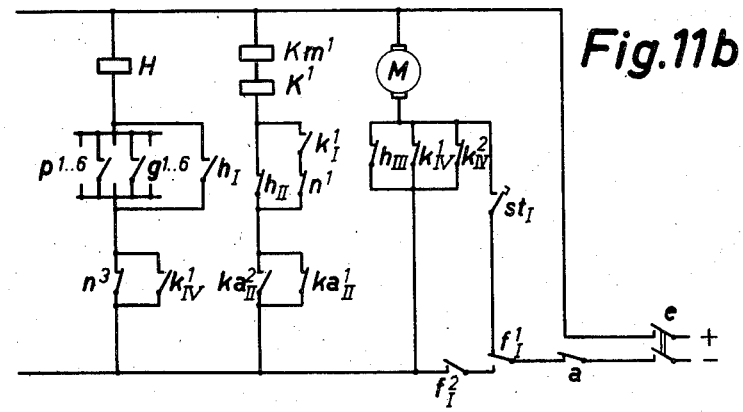

Figs. 11a and 11b are to be put side by side and show the wiring diagram of the machine.

*Principles of the manner of operation*

In the right hand magazine 5 (Fig. 4b) the item cards sorted according to groups are deposited. In the left hand magazine 6, however, the associated total cards are deposited which are arranged as regards their group number in the same sequence as the groups of item cards. The item cards are fed from the magazine towards an analyzing device controlling the printing mechanism. The printing device is set in accordance with the perforations in the card and the respective values are printed, Upon group change of the item cards the item card feed is interrupted and instead thereof the summary card feed is initiated. Now, the summary cards are fed to a second analyzing device which may also control the printing mechanism. Thereupon the values which are punched in the total card are printed.

If the item card of a group is analyzed the group number of the summary card is compared with that of the item card. If the two group numbers do not agree the machine is stopped.

The item cards are deposited after the analysis in the magazine 7 and the summary cards in the magazine 8.

Figure 2:
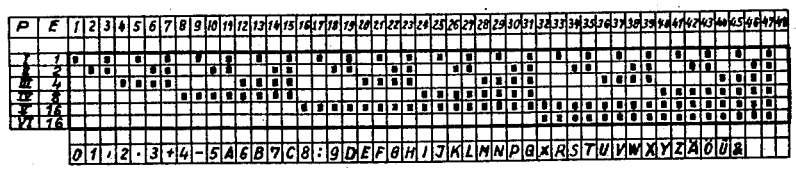
Fig. 2 shows the perforation code according to which the machine is operating.
Figure 3:
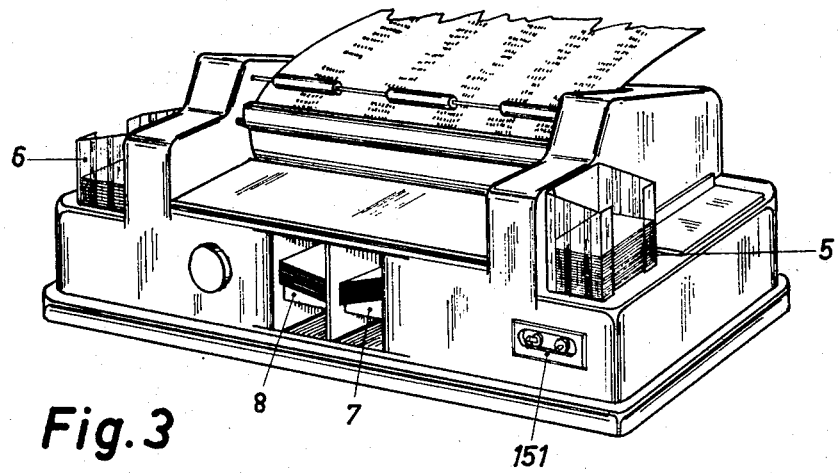
Fig. 3 shows a perspective total view of the machine.

The mechanism of the printing device operates according to a code shown in Fig. 2. The code is so arranged that the interpretation of a character is given by a value resulting from the addition of the partial values associated with the various hole positions. The valuations for the various positions are selected in a way which allows a certain value to be indicated only by a single hole combination. In determining the code it has further been assumed that for numerals, alphabet and other characters there are about 45 hole combinations necessary. In order to obtain a certain margin the code was chosen with 47 characters plus a vacant field thus permitting in Fig. 2 the insertion of two further characters, if desired. In Fig. 2 the positions (column P) are designated by I to VI and their associated valuations 1–2–4–8–16–16 are shown in column E.

The characters can be associated arbitrarily with the various hole combinations, but the position of a character within the row of characters is determined by the numerical interpretation of the hole combination. Accordingly, in arranging the type on a type wheel the latter must be divided into 48 equal sections. A particular character is associated with each section.

The printing device consists of a row of adjacent type wheels. There is a common drive provided for all type wheels to which the type wheels may be clutched. Clutching takes place as soon as a hole has been detected in the analyzed position. Unclutching is effected automatically as soon as the type wheel has been adjusted to the corresponding value and the card is moved to the next hole position. Printing will only take place if all six positions of a column have been analyzed. Accordingly, clutching can be effected for each position and unclutching will automatically take place past each position wherever clutching has been effected. In this way it is possible that the type wheel may be adjusted several times before printing takes place.

The drive is provided in such manner that its displacement is varied from position to position except between the two lowermost positions. If several holes are provided in a column the displacements determined by their values will be added one by one. If it is assumed for instance that in a column the positions III and V are punched the type wheel will be moved upon the analysis of the position III through four units and upon analysis of the position V through sixteen units. Upon analysis of the positions I, II, IV, VI no movement takes place since there was no hole provided in the same and consequently a clutching operation has not occurred. Accordingly, the type wheel had been moved for twenty units which according to the code corresponds to the character "E."

Figure 1:
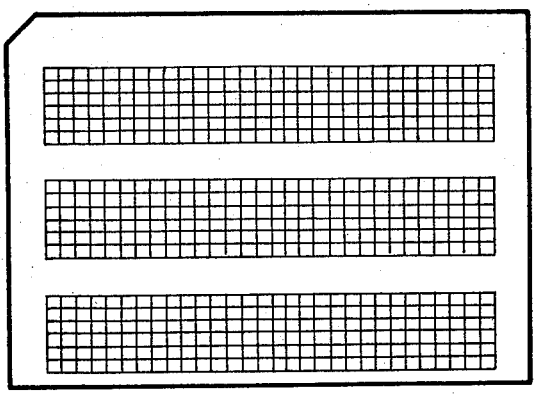
Fig. 1 shows a card as it is used in the machine.

The perforated record card (Fig. 1) is formed as triple deck card. Each deck has 30 columns with six hole positions in each column. The perforation columns of the three decks are analyzed simultaneously one by one, position by position, and the results of the analysis are transferred to the printing mechanism.

The machine is provided with 120 printing positions which by means of the plug board may be connected to each of the brushes or columns respectively. The circuit diagramme will be described more in detail later on. The drive for the printing mechanism is effected by a crank drive which permits a quiet and safe clutching and unclutching at its dead centre positions. Further the return movement which necessarily occurs in a crank drive can be used for unclutching. One of the positions of the crank drive which occur during the deck analysis namely that for the value 8 is illustrated in the operating diagramme according to Fig. 6.

The crank 11 is continuously driven with constant speed in counterclockwise direction. During each turn of the crank the card is advanced for one position. Upon each full revolution of the crank 11 the crank 12 is displaced one step in counterclockwise direction. This displacement will be described in more detail later on. A rod 14 is pivoted to the crank 11, said rod being provided for reciprocating movement in the guide 15. The left hand end of rod 14 describes an ellipselike curve. If the guide 15 is moved the curve will change. At the left hand end of the rod 14 there is the rocker 13 connected thereto by the link 16 which latter rocks in accordance with the curve. The angle through which the rocker 13 swings is dependent upon the shape of the curve. The guide 15 is now moved in such a way as to cause the various angles of swing of the rocker 13 to be proportioned to each other in the same manner as the values according to Fig. 2. In all five positions (the sixth position is identical with the fifth position) a constant angle must be subtracted in which the rocker runs idle on account of the play between the gears, and other parts. This play is also necessary for another reason and as will be shown later, it is intentionally increased so that the drive can remain stationary at the moment of clutching.

The position and dimensions of the crank drive have been chosen in such a manner that at the one dead centre of the rocker 13 the guide 15 as well as the auxiliary crank drive cooperating therewith (described later) may be adjusted without changing the position of the rocker 13. This is necessary since the clutch for the clutching of the registering places to their drive must be always in the same position independently of the position in which the guide 15 happens to be. It is only necessary to take care that the guide 15 has already reached the positions (indicated in Fig. 6 by Roman numerals in accordance with the hole position designation) associated with the analyzing positions of the hole positions at the second dead centre of the rocker 13 (indicated in dash lines in Fig. 6) since the position of this point determines the amount by which the type wheel will be advanced.

The adjustment of the guide 15 is effected by the crank 12. The latter makes one revolution for each card run. Dimensions and position have been chosen here in such manner that the unequal distances between consecutive positions of the guide 15 on the rod 14 may be transformed into equal movements of the crank 12. This is an advantage in so far as in addition to the step by step shifting also a continuous drive of the crank 12 can be derived from crank 11, if desired.

*Construction of the crank drive*

The actual construction of the crank drive is shown in Fig. 5. The rod 14 is linked to the crank 11. It has a rectangular cut out portion 14a in which can slide a guide piece. The guide piece is loosely seated and rotatable upon the pivot pin 18. On the pin 18 there are further mounted two loose guide pieces adapted to slide in the guide bars 21 which are provided on both sides of rod 14 and are fast to the base plate. As a protection against mutual interference of rod 14 and the guide bars 21 and in order to prevent the guide pieces from sliding off the disks 22 are provided between the guide pieces. The arrangement of the guide pieces permits sliding of the pin 18 in the guide bars 21, sliding of the rod 14 on the pin 18 and rocking of the rod 14 relative to the fixed guide bars 21 about the axis 18. The displacement of the guide pieces is effected by the two links 23 which are screwed fast to the pin 18. At the upper end of the rod 14 the rocker 13 is connected by the link 16. The rocker 13 is rotatably mounted on the stud 24 which is fast to the base plate and upon which also the toothed segment 25 can turn loosely. The rocker 13 can take the toothed segment 25 with it by engaging the two stops 26. The position of the stops has been chosen in such manner that upon the change of direction the rocker 13 moves idly through a certain angle with respect to segment 25. This idle movement is necessary in order that when clutching of the registering mechanism takes place (as before mentioned) at the one dead centre, the drive is stationary. The toothed segment 25 meshes with the pinion 27 from which the drive for the printing mechanism is derived.

The positioning of links 23 and therewith of guide 15 is effected by crank 12 which in practice takes the form of a ratchet wheel. The rocker 28 connected to the links 23 is rotatably mounted at its right hand end on the stud 30 which is fast in the casing. The rocker 28 is necessary in order to safeguard the proper positioning of the link 23 and thereby also of the guide.

Movement of the ratchet wheel 12 is effected by pawl 29. The pawl 29 is rotatably mounted on the rocker 31 and is resiliently held against the ratchet wheel 12. The rocker 31 is driven by an eccentric 33 and the eccentric rod 34. The eccentric 33 is mounted upon the same shaft as the crank 11 so that the rocker 31 will rock back and forth once at each revolution of the crank 11. By this means the ratchet wheel 12 will be moved one step by means of pawl 29. By this movement the movement of the guide 15 is effected through bar 17 and link 23, the bar 17 being pivotally mounted on the ratchet wheel 12.

The position of the guiding pieces in the guide bars 21 must be exactly defined after the rocker 13 has reached the outer dead centre. This is necessary since at this moment declutching of the type wheel takes place. As indicated above, this dead centre position also indicates the value for the associated position. During the remaining time the guide may be moved, this movement having however no influence upon the adjustment. The position of the guide has no influence upon clutching since the crank drive and the position of the guide bars 21 have been chosen in such manner that the position of the one dead centre is independent of the positioning of the guide.

Provision must be made that forces occurring and tending to move the guide from the predetermined position which must in no event occur at the outer dead centre, cannot have any influence. Therefore, the ratchet wheel 12 is arrested at this moment and is blocked in both directions of rotation so that no unforeseen movements can arise. Blocking is effected by the lever 35 with its semicircular cut out portion 35a. The cut out portion 35a of lever 35 can engage over the screw heads thus blocking the rotation of the crank disk 12 in both directions. This blocking must be maintained for some time. Moreover, a quick engagement is desired which is obtained by a snap-action mechanism. The arm 37 is rotatably mounted upon the stud 38 fast to the casing and is connected through link 39 to the rocker arm 31. Therefore the arm 37 will rock synchronously with the rocker arm 31. Upon the stud 38 there is also rotatably mounted the lever 35 which is connected by spring 41 to the arm 37. Under the influence of the rocking movement of arm 37 the lever 35 will now continuously snap back and forth between the stop 42 and the screws 36. The dead centre has been positioned in such manner that the lever 35 engages the screw 36 when the guide or the screws 36 respectively have reached the proper position.

*Clutch system for type wheels and accumulator*

The back and forth movement of the pinion 27 (Fig. 5) is transferred through a gear mechanism to the shaft 78 having the gears 45 (Figs. 8 and 9) fast thereon. The arrangement of the wheels in Figs. 8 and 9 does not exactly correspond to the position in the machine. This arrangement has been chosen in order to permit a clearer view of the section in Fig. 9. For each type wheel a pinion 45 is provided. The latter meshes with the pinion 46 which is firmly pressed upon the ring 47. In the ring 47 there is provided a slot 47a accommodating the pawl 48 and the spring 49. By spring 49 the pawl 48 may always be held in one of two rest positions. The ring 47 only rotates upon the teeth of actuating wheel 51. To the actuating wheel 51 the pinion 52 is rigidly fixed the latter engaging the pinion 53. The actuating wheel 51 is rotatably mounted upon the shaft 50 and the gear 53 is rigidly connected to the type wheel 54.

According to the value of the effective hole position each ring 47, driven by its pinion 45 will be rotated. If the clutch magnet has been energized slightly earlier, by a hole in the card, the lever 81 will encounter the pawl 48, which will be pressed into a gap between the teeth of the actuating wheel 51, said pawl taking the wheel 51 with it in counterclockwise direction (Fig. 8). Through pinions 52 and 53 the type wheel is thereby moved accordingly. The control for the engagement is derived from the contact i (Fig. 6) which is closed if the crank drive or the rings 47, respectively, are in engaging position. The movement of the actuating wheel 51 always takes place for a multiple of the pitch so that the teeth will always be again in the proper position for engagement.

Upon backward movement of ring 47 the type wheel 54 and therewith gear 53 are locked against backward movement by spring 56 (Fig. 7). The spring 56 engages with a locking wheel 57 which is fast to the gear 53, the latter meshing again with gear 53. Accordingly, also gear 51 is blocked against rotation in clockwise direction (Fig. 8). The pawl 48 is forced outward by the inclined back face of the tooth until it reaches its outer position in which it will then be held by the spring 49.

Accordingly, declutching will automatically take place right at the beginning of the backward movement. The ring will now run back until the dead point for the next clutching operation is reached.

*Printing mechanism*

The crank drive is provided on the left side wall of the machine (Fig. 4a) and is easily accessible. It is driven by the motor 65 (Fig. 10) through the worm drive comprising the worm 66 and the worm wheel 67, shaft 68, screw wheels 69 and 73 and shaft 72 on which is fast the crank 11 of the crank drive. The drive is derived from the crank drive at pinion 27 and shaft 71 through a gearing ratio to two groups of clutch systems.

Staggering of the clutches (Fig. 7) in two groups has been chosen in order to obtain a small lateral type pitch. In this way a printing column pitch of 3 mm. will suffice.

The arrangement of the clutch magnets requires a further staggering in six groups of magnets. The magnets are so arranged that always three groups of magnets operate upon one group of the two groups of clutches. From Fig. 8 it may be seen that the position of pawl 48 or of ring 47 is of no importance for the position of engagement. It is only imperative that upon engagement the point of the pawl is always over any one of the tooth gaps of the actuating wheel 51. The clutch levers are rotatably mounted upon the three spindles 79 and provision is made that they are alternately directed upward and downward on each spindle. Each of the levers 81 of both outer spindles 79 acts upon the same group of clutches while the levers 82 of the middle spindle 79 act alternately upon one of both groups of clutches.

Printing is effected by means of the printing hammer 63, which presses the ribbon and the paper upon printing against the type wheels. The paper is fed by means of the rollers 64 and is advanced for one step after each printing operation. The drive for the step by step shifting is derived from shaft 72 which is continuously driven. Through a ratio gearing including the gears 74, 75, 76 and 77 the crank 83 is driven in such manner that it rotates once per printing operation. To the crank 83 the rocker 85 is linked by means of link 84, said rocker being mounted on the stud 86. Further the ratchet wheel 87 is mounted on the stud 86. On the rocker 89 there is provided the pawl 88 which is resiliently pressed against the ratchet wheel 87. Upon each rocking movement the pawl 88 advances the ratchet wheel 87 for one step. The spring 89 engaging the ratchet wheel 87 will therewith lock the latter against backward movement. Gear 91 is rigidly connected to the ratchet wheel 87 and is meshing with the gear 92. The latter meshes again with the gear 93. The gear 92 is provided on the shaft 94 and the gears 93 on the shaft 95 upon which there are fast the rollers 64 (Fig. 7) for the paper feed.

The drive for the printing hammer is effected by the shaft 96, which rotates once in clockwise direction per card or printing cycle, respectively. Thereupon the cam 97 will rock the lever 98 in counterclockwise direction said lever being fast on the shaft 99. Upon the shaft 99 there is also fast the printing hammer 63. If the cam 97 has moved past the lever 98 the latter jerks back due to the spring 101 against the rubber cushion 102. The printing hammer is therewith pressed against the types.

If the type wheels are to be zeroized which is effected at the end of each printing the shaft 61 is rotated once in clockwise direction. Depending on the setting of the type wheels the pawls 62 mounted thereto will drop into the groove of the shaft 61 so that the type wheels are moved upon rotation of the shaft until they have reached the zero-position.

Card feed

The construction of the card feeding mechanism is provided in the same way for the item cards and for the summary cards. Fig. 4a shows the card knife, the analyzing brushes as well as the feed rollers which in this instance represent the summary card feeding mechanism. Fig. 4b shows the drive for the card knife and the feed rollers for the item cards. As has already been mentioned above, the item cards are deposited in the receiving magazine 5 and the summary cards in the receiving magazine 6. By means of the card knife 111 the cards are moved to the feed rollers 112 and are fed by the same past the analyzing brushes step by step. Subsequently, they are deposited on the card support 113 in the receiving magazine 7 or 8, respectively. If one of the card receivers is filled with cards and if the support 113 has arrived at its lowermost position, it will open a contact $a$ not illustrated which is interrupting the current through the machine, thus rendering the same stationary. The contact $a$ will again be referred to later on in the description of the wiring.

The card knife 111 is fast on the slide 114 adapted to slide back and forth on the guides 115. The reciprocating movement of the slide 115 for the item cards is effected by the crank 116 (Fig. 4b). The same rotates once for each item card cycle. The crank for the drive of the card knife for the summary cards, however, rotates only once during every two card cycles. The crank 116 for the item cards is driven by the shaft 63 (Fig. 10) through the worm 117, the worm wheel 118, the screw wheels 119, 121 and the shaft 122. On the latter there is fast the crank 116. To the same is linked the rocker 124 by means of link 123, said rocker being loosely mounted on the stud 125. On the stud 125 there is further mounted the lever 126. Spring 127 tends herein to turn the lever in counterclockwise direction. This turning movement is, however, locked by the armature 128 of the magnet $Km^1$, engaging the lip 126a of the lever 126. If the magnet $Km^1$ is energized and attracts its armature 128 the latter will release the lip 126a. The lip now encounters the rocker 124 and is moved upon the rocking movement of the latter. Accordingly, the lever 126 will make the same rocking movements as the rocker 124. The lever 126 is forklike provided on its upper end and extends over a stud of the slide 114 which carries the card knife 111. Accordingly, the reciprocating movement of the rocker 124 is transferred to the card knife which accordingly will advance cards from the magazine. This can be maintained as long as the magnet $Km^1$ remains energized.

In a similar manner as the drive for the card knife the step by step shifting drive for the card feed is provided. It is effected by the crank 129 to which the rocker 132 is linked by means of link 131. The rocker is mounted on the stud 133. The crank 129 has the same speed as the crank 11 of the crank drive and rotates once for each type wheel setting or analysis of a hole position, respectively. On the stud 133 is mounted the lever 134, a spring 135 tending to turn the same in clockwise direction. This turning is, however, prevented by the armature 136 of the magnet $K^1$. If the magnet $K^1$ is energized it will attract its armature 136 which releases the lever 134. Hereupon the lip 134a of the lever 134 encounters the rocker 132 and follows the latter in its rocking movement.

On the lever 134 there are mounted the two pawls 137 and 138. The pawl 137 serves herein for the slow card feed during the deck analysis and is resiliently pressed against the ratchet wheel 139. The pawl 138 serves for the fast feed during the card change and is resiliently pressed against the ratchet wheel 141. The detent spring 142 engaging a detent wheel not represented locks when the ratchet wheels against backward movement. The position of the two pawls as well as the teeth of the two ratchet wheels has been chosen in such manner that the pawls act always alternately upon the card feed. The two ratchet wheels as well as the locking wheel are fast upon the shaft 143 driving through screw wheels 144 and 145 (Fig. 10) the shaft 146 and from the latter through worms the rollers 112 for the card feed. The drive for the total card feed is exactly the same as the one just described. It is clutched in this instance by the magnets $K^2$ and $Km^2$ being represented only in the wiring diagramme. The movement of the drive is derived from the shaft 147 which is also continuously driven by the motor.

Contact control

In the machine there are provided several cam contacts serving for the time differential control of the various machine cycles.

The contact $i$ is actuated by the cam 11a of the crank 11 (Fig. 5). The position and the shape of the cam have herein been so chosen that the contact $i$ is instantaneously closed if the crank drive is in the one dead centre for the clutching of the type wheels. It is the purpose of contact $i$ to release the current impulses to the clutch magnets in an exactly predetermined moment.

The contacts $n_0$, $n^1$ and $n^2$ are arranged side by side (in Fig. 10 only the foremost can be seen) and are actuated by the cams 152, 153 and 154 which are seated on the shaft 109 rotating once per each card cycle. The position and shape of the cam 152 has herein so been chosen that the contact $n_0$ is always closed if there is a deck under the analyzing device. The contact $n^1$ is actuated by the cam 153 which opens said contact instantaneously at the end of a card cycle. The cam contact $n^2$ is also instantaneously opened at the end of a card cycle by the cam 154 but shortly before the opening of the cam contact $n^1$.

The cam contact $n^3$ as well as the shifting contacts $u$ (Fig. 4a) are actuated by the cams 158 and 161 being fast to the gear 157. The latter is driven by the gear 156 on the shaft 155 which rotates only as long as the total card feed is operating. The ratio has been so chosen that the two cams 158 and 161 rotate once per total card cycle. The cam 156 opens the cam contact $n^3$ instantaneously at the end of a total card cycle. The cam 161 shifts the contact $u$ if the deck of the total card is under the second set of analyzing brushes $bs_{II}$.

*Wiring*

The Figs. 11a and 11b representing the wiring diagramme are to be put side by side. The wiring has been represented in a simplified method as is generally used in the art of communication.

Before the machine is switched in, the two supply magazines must be filled with cards. Thereby the contacts $f^1$ are shifted and the contacts $f^2$ are closed which control whether there are cards in the magazine. If now the main switch $e$ is closed the motor will receive current from negative through the contacts $a$, $f^1_I$, $h_{III}$ so that the machine will start running. Simultaneously therewith also the clutch magnets $K^1$, $Km^1$ receive current from the contact $f^2_I$ through the card lever contact $ka^1_{II}$ and $h_{II}$. The two magnets respond thereby clutching the feeding mechanism for the item cards. Moreover also the two clutch magnets $k^2$ and $Km^2$ receive current through the contacts $ka^2_{III}$ and $k^1_{III}$. The two magnets also respond and engage the card feeding mechanism for the total cards. Now, simultaneously the first item card and the first total card are fed to the anlyzing devices. Due to the response of the magnet $K^2$ the same has closed its contact $k^2_I$ so that the magnet remains energized if shortly thereafter the contact $k^1_{III}$ is opened by the magnet $K^1$.

If the first item card has reached the second set of brushes $b_{II}$ it will actuate by means of a card lever the contacts $ka^1_I$, $ka^1_{II}$ and $ka^1_{III}$. By the depressing of the card lever the contact $ka^1_{III}$ has been closed and the card lever contact $ka^1_{II}$ has been opened. Thereby the latter interrupts the current circuit to the two clutch magnets $K^1$ and $Km^1$ so that the same will drop, the card feed thus becoming stationary. If now the first total card has reached the first set of brushes $bs_I$ the same depresses the card lever 148 which actuates the contacts $ka^2_I$, $ka^2_{II}$ and $ka^2_{III}$. Hereupon the card lever $ka^2_{II}$ closes so that the current circuit to the clutch magnets $K^1$ and $Km^1$ is again established and the item card feed is initiated. The opening of the card lever contact $ka^2_{III}$ has no influence on the energization of the clutch magnets $K^2$ and $Km^2$ since the contact $ka^2_{III}$ is short-circuited through the contact $ka^1_{III}$.

Now the hole positions of the first item card as well as of the first total card pass step by step under the analyzing brushes $b_{II}$ or $bs_I$, respectively. Shortly, before the first position arrives under the analyzing brushes the cam contact $n_0$ closes which remains closed as long as there is a deck under the analyzing device. If the first position is under the analyzing brushes also the cam contact $i$ closes which (as has already been mentioned above) is instantaneously closed upon the analysis of each position and which controls the exact moment for clutching so that now current can flow from the contact $f^2_I$ through the contacts $st_{II}$, $i$, $n_0$, the now closed card lever contact $ka^1_I$, through the contact $k^1_{II}$, through the brushes $b_{II}$ having passed through a hole of the item card, through the shifting contacts $u$, the plug board, the magnets D of the printing device. The clutch magnets D are energized in accordance with the analysis and clutch the respective type wheels to the drive which at that time is set to the valuation 1.

At the same time, however, current may also flow from $b_{II}$ through the left hand winding of the group control relays G. Furtheron current is flowing from the contact $k^1_{II}$ through the brushes $b_I$ having passed through a hole of the second item card, through the right hand winding of the group control relays. The latter are provided as differential relays and respond if current is flowing through one winding only. If the perforation in the first and second item card for the group number are identical in all group control relays current is flowing through both windings simultaneously and the group control mechanism does not respond.

Further current may flow from the brushes $b_{II}$ through the right hand winding of the verifying relay P and through the contact $k^2_{III}$ closed at that time by the magnet $K^2$. Simultaneously therewith current is also flowing from the contact $n_0$ through the card lever contact $ka^2_{II}$ being closed at that time, the contacts $k^2_{II}$ and $u^{91}$, through the brushes $bs_I$ having passed through a hole in the summary card and analyzing the group number, through the left hand winding of the verifying relays P. The verifying relays P are also provided as differential relays and will only respond if the group numbers of the first item card and the summary card do not agree.

After the first position has been analyzed and the type wheels are set accordingly the contact $i$ opens whereupon the second position is fed under the brushes. The contact $i$ interrupts the current circuit before the brushes have been lifted by the cards and therefore avoids sparking. As regards the second and the now following positions the analysis is repeated as just described whereby the type wheels are set in accordance with the perforation.

If all positions of the first item card have been analyzed and are entered into the printing mechanism and if the group numbers have been compared with the first total card the cam contact $n^2$ opens instantaneously which interrupts the current circuit through the clutch magnets $K^2$ and $Km^2$ so that the latter will drop and will stop the total card feed. Furtheron they cause opening of the contacts $k^2_I$, $k^2_{II}$ and $k^2_{III}$. The contact $k^2_I$ now maintains the interruption of the current circuit to the clutch magnets, to contact $k^2_{II}$ that to the analyzing brushes for the total cards and the contact $k^2_{III}$ that to the verifying relays P.

The item card feed, however, remains engaged so that now the second item card is fed under the analyzing brushes $b_{II}$ and that the perforations of said card control the printing mechanism. If now an item card follows having a different group number in one or a plurality of group control relays G current will flow through one winding only so that the relays will temporarily respond and will close their contacts $g$. Thereby the current circuit to the auxiliary relay H will be closed so that the same responds and actuates its contacts $h_I$, $h_{II}$ and $h_{III}$ which prepare the total card cycle. The contact $h_I$ closes and establishes thereby a holding circuit for the relay H. The contact $h_{II}$ is opened; at this time this has however, not yet any influence upon the machine since the contact $h_{II}$ has been short-circuited through the contacts $n^1$ and $k^1_I$.

If the analysis of the last item card of the group is finished the cam contact $n^1$ opens temporarily so that the holding circuit to the clutch magnets $K^1$ and $Km^1$ is interrupted, the magnets drop thereby stopping the item card feed. Due to the dropping of the clutch magnet $K^1$ the contact $k^1_{III}$ is closed so that now again the clutch magnets $K^2$ and $Km^2$ receive current and engage the total card feed. Now the total card is fed past the analyzing brushes $bs_{II}$. Simultaneously therewith the contacts $u$ controlled by the cam 161 have been shifted, said cam rotating synchronously with the total card feed. The printing magnets D now receive their current through the cam contact $n_0$, the card lever contact $ka^2_I$, the contact $k^2_{II}$ again closed by the magnet $K^2$ through the contact $u^{91}$, through the brushes $bs_{II}$ having passed through a hole in the card, through the contacts $u^1 \cdots {}^{90}$, the plug board and through the printing magnets D. The The type wheels will be set in accordance with the perforations in the total card.

After all positions of the summary card have been analyzed the cam contact $n^3$ opens instantaneously thereby interrupting the current circuit to the auxiliary relay H so that the latter will drop. Thereby again the contact $h_{II}$ is closed so that the clutch magnets $K^1$ and $Km^1$ receive current and engage the item card feed. Now the first item card of the following group is moved past the analyzing brushes $b_{II}$. Simultaneously therewith the second total card passes the analyzing brushes $bs_I$. If said total card has a group number differing from that of the item card now being analyzed, in one or a plurality of relays P current will flow through one winding only, so that the relays are temporarily energized and close the contact $p$. Thereby the auxiliary relay H receives current so that it responds and open its contact $h_{III}$. Since at that moment also the two clutch magnets $K^1$ and $K^2$ are energized the associated contacts $k^1_{IV}$ and $k^2_{IV}$ have been opened. Thereby the current circuit through the motor M is interrupted so that the machine is rendered stationary. This indicates that the total cards do not agree with the analyzed item cards or that the cards have been sorted incorrectly. The operator must now remove the cards from the supply magazine and has to depress the key 151 which actuates the two contacts $st_I$ and $st_{II}$. The contact $st_I$ establishes again the current circuit to the motor M and the contact $st_{II}$ interrupts the current circuit to the whole analyzing device. Subsequently the cards still being in the machine are fed into the card receiving magazines.

If one of the card receivers is filled with cards, the receiving carriage actuates in its lowermost position the contact $a$ which interrupts the whole current circuit through the machine, thus stopping the latter.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

I claim:

1. In an apparatus of the type described, in combination, first analyzer means for analyzing marks on cards; second analyzer means for analyzing marks on cards; first feeding means for consecutively feeding a plurality of first cards to said first analyzer means; second feeding means for consecutively feeding a plurality of second cards to said second analyzer means, said first and second cards bearing marks including group designating marks; a printing mechanism for printing marks on a record carrier means; analyzer selecting means for selectively connecting said first and second analyzer means with said printing mechanism whereby selective printing of marks corresponding to the marks on said first and second cards is effected; feed selecting means for selectively actuating said first and second feeding means; and a group control mechanism including sensing means for determining group designating marks on fed first cards, said group control mechanism controlling said analyzer selecting means and said feed selecting means, and operating said feed selecting means to actuate said first feeding means, and operating said analyzer selecting means to connect said first analyzing means with said printing mechanism as long as said sensing means sense the same group designating marks on all consecutively fed first cards, said group control mechanism operating said feed selecting means to actuate said second feeding means, and operating said analyzer selecting means to connect said second analyzer means with said printing mechanism when said sensing means sense a different group designating mark on one of said fed first cards.

2. In an apparatus of the type described, in combination, first analyzer means for analyzing marks on cards; second analyzer means for analyzing marks on cards; first feeding means for consecutively feeding a plurality of first cards to said first analyzer means; second feeding means for consecutively feeding a plurality of second cards to said second analyzer means, said first and second cards bearing marks including group designating marks; a printing mechanism for printing marks on a record carrier means; analyzer selecting means for selectively connecting said first and second analyzer means with said printing mechanism whereby selective printing of marks corresponding to the marks on said first and second cards is effected; feed selecting means for selectively actuating said first and second feeding means; a group control mechanism including sensing means for determining group designating marks on fed first cards, said group control mechanism controlling said analyzer selecting means and said feed selecting means, and operating said feed selecting means to actuate said first feeding means, and operating said analyzer selecting means to connect said first analyzer means with said printing mechanism as long as said sensing means sense the same group designating marks on all consecutively fed first cards, said group control mechanism operating said feed selecting means to actuate said second feeding means, and operating said analyzer selecting means to connect said second analyzer means with said printing mechanism when said sensing means sense a different group designating mark on one of said fed first cards; a checking device for checking said group designating marks on said first cards, and on second cards fed due to actuation of said second feeding means by said group control mechanism, said checking device assuming a first position when consecutively fed first and second cards have corresponding group designating marks and a second position when consecutively fed first and second cards have different group designating marks; and means for stopping at least said printing mechanism before the same is operated by said second analyzer means when said checking device assumes said second position.

3. In an automatic record card controlled machine a card magazine for index marks bearing principal cards, said index marks including group designations, a further card magazine for index marks bearing associate cards, said index marks including also group designations, analyzing means for said principal cards, analyzing means for said associate cards, a printing mechanism common to and controllable by either one of analyzing means, means for feeding said principal cards one by one past said principal card analyzing means and means for feeding said associate cards one by one past said associate card analyzing means, analyzer selecting means for selectively setting the common printing mechanism either under the control of said principal card analyzing means or under the control of said associate card analyzing means, feed selecting means for selectively feeding either the principal cards or the associate cards past their corresponding analyzing means, and a group control mechanism including sensing means for determining the group designation marks of said principal cards, said feed selecting means as well as said analyzer selecting means being under the control of said group control mechanism, the principal cards being fed and their analyzers controlling the printing mechanism by the successive principal cards as long as the group designations of the latter are in agreement whereas upon detection of a group change the group control mechanism will initiate the feed of the associate cards for a predetermined period and said analyzer selecting means selecting said associate card analyzing means to control the printing mechanism.

4. In an automatic record card controlled machine, a card magazine for groups of item cards bearing index marks representing items and group designations, a further card magazine for total cards, each total card bearing index marks representing the total of the items of a group of item cards and the respective group designation, analyzing means for said item cards, analyzing means for said total cards, a printing mechanism common to and controllable by either one of analyzing means, means for feeding said item cards one by one past said item card analyzing means and means for feeding said total cards one by one past said total card analyzing means, analyzer selecting means for selectively setting the common printing mechanism either under the control of said item card analyzing means or under the control of said total card analyzing means, feed selecting means for selectively feeding either the item cards or the total cards past their corresponding analyzing means, a group control mechanism including sensing means for determining the group designation marks of said item cards, said group control mechanism governing said feed selection means as well as said analyzer selection means, the item cards being fed and their analyzer controlling the printing mechanism by the successive item cards as long as the group designations of the latter are in agreement whereas upon detection of a group change the group control mechanism will initiate the feed of a total card past the respective analyzing means and said analyzer selection means selecting said total card analyzing means to control the printing mechanism.

5. In an automatic record card controlled machine, a card magazine for index marks bearing principal cards, said index marks including group designations, a further card magazine for index marks bearing associate cards, said index marks including also group designations, analyzing means for said principal cards, analyzing means for said associate cards, a printing mechanism common to and controllable by either one of analyzing means, means for feeding said principal cards one by one past said principal card analyzing means and means for feeding said associate cards one by one past said associate card analyzing means, analyzer selecting means for selectively setting the common printing mechanism either under the control of said principal card analyzing means or under the control of said associate card analyzing means, feed selecting means for selectively feeding either the principal cards or the associate cards past their corresponding analyzing means, and a group control mechanism including sensing means for determining the group designation marks of said principal cards, said feed selecting means as well as said analyzer selecting means being under the control of said group control mechanism, the principal cards being fed and their analyzers controlling the pinting mechanism by the successive principal cards as long as the group designations of the latter are in agreement whereas upon detection of a group change the group control mechanism will initiate the feed of the associate cards for a predetermined period and said analyzer selecting means selecting said associate card analyzing means to control the printing mechanism, a checking device comparing before the printing of an associate card the group designation of the latter with the group designation of the principal cards foregoing a group change, and means for preventing the control of said printing mechanism by said associate card if the group designations of both kinds of cards are in disagreement.

6. In an automatic record card controlled machine, a card magazine for groups of item cards bearing index marks representing items and group designations, a further card magazine for total cards, each total card bearing index marks representing the total of the items of a group of item cards and the respective group designation, analyzing means for said item cards, analyzing means for said total cards, a printing mechanism common to and controllable by either one of said analyzing means, means for feeding said item cards one by one past said item card analyzing means and means for feeding said total cards one by one past said total card analyzing means, analyzer selecting means for selectively setting the common printing mechanism either under the control of said item card analyzing means or under the control of said total card analyzing means, feed selecting means for selectively feeding either the item cards or the total cards past their corresponding analyzing means, a group control mechanism for searching the group designations of said item cards, said group control mechanism governing said feed selection means as well as said analyzer selection means, the item cards being fed and their analyzers controlling the printing mechanism by the successive item cards as long as the group designations of the latter are in agreement whereas upon detection of a group change the group control mechanism will initiate the feed of a total card past the respective analyzing means and said analyzer selection means selecting said total card analyzing means to control the common printing mechanism, a checking device comparing before the printing of a total card the group designation of the latter with the group designation of the group of item cards foregoing a group change, and means for preventing the control of said printing mechanism by said total card if the group designations of both kinds of cards are in disagreement.

7. In an automatic record card controlled machine, a card magazine for index marks bearing principal cards, said index marks including group designations, a further card magazine for index marks bearing associate cards, said index marks including also group designations, means for feeding said principal cards one by one along a principal card feeding path and means for feeding said associate cards one by one along an associate card feeding path, a primary and a secondary set of analyzing means spaced apart on said principal card feeding path so as to analyze simultaneously two successive principal cards, the preceding card being analyzed by the primary and the subsequent card being analyzed by the secondary set, a primary and a secondary set of analyzing means spaced apart on said associate card feeding path so as to analyze simultaneously two successive associate cards, the preceding card being analyzed by the primary set and the subsequent card being analyzed by the secondary set, a printing mechanism common to said two primary sets of analyzing means and controllable by any one of said primary sets, analyzer selection means for selectively setting the common printing mechanism either under the control of the primary set of principal card analyzing means or under the control of the primary set of associate card analyzing means, feed selecting means for selectively actuating the principal card feeding means or the associate card feeding means, a group control mechanism under the supervision of said primary set and said secondary set of principal card analyzing means for searching the group designations of successive principal cards, a checking device for sensing group designations and being under the supervision of the primary set of principal card analyzing means and the secondary set of associate card analyzing means, said feed selecting means as well as said analyzer selecting means being under the joint control of said group control mechanism and said checking device, the principal cards being fed and their analyzers controlling the printing mechanism by the successive principal cards as long as the group designations of the latter are in agreement whereas upon detection of a group change the group control mechanism will initiate the feed of the associate cards for a predetermined period and said checking device permitting said analyzer selecting means to control the common printing mechanism by said secondary set of associate card analyzing means only if the checking device has determined an agreement between the group designation of the associate card and the group designation of the previously analyzed group of principal cards.

8. In a machine as specified in claim 7, means for automatically rendering the checking device inoperative after the passage of the first card of a group of principal cards past the primary set of principal card analyzing means and the simultaneous passage of an associate card past the secondary set of associate card analyzing means.

9. In an automatic record card controlled machine, a card magazine for groups of item cards bearing index marks representing items and group designations, a further card magazine for total cards, each total card bearing index marks representing the total of the items of a group of item cards and the respective group designation, means for feeding said item cards one by one along an item card feeding path and means for feeding said total cards one by one along a total card feeding path, a primary and a secondary set of analyzing means spaced apart on said item card feeding path so as to analyze simultaneously two successive item cards, the preceding card being analyzed by the primary and the subsequent card being analyzed by the secondary set, a primary and a secondary set of analyzing means spaced apart on said total card feeding path so as to analyze simultaneously two successive total cards, the preceding card being analyzed by the primary set and the subsequent card being analyzed by the secondary set, a printing mechanism common to said two primary sets of analyzing means and controllable by any one of said primary sets, analyzer selection means for selectively setting the common printing mechanism either under the control of the primary set of item card analyzing means or under the control of the primary set of total card analyzing means, feed selecting means for selectively actuating the item card feeding means or the total card feeding means, a group control mechanism under the supervision of said primary set and said secondary set of item card analyzing means for searching the group designations of successive item cards, a checking device for searching group designations and being under the supervision of the primary set of item card analyzing means and the secondary set of total card analyzing means, said feed selecting means as well as said analyzer selecting means being under the joint control of said group control mechanism and said checking device, the item cards being fed and their analyzers controlling the printing mechanism by the successive item cards as long as the group designations of the latter are in agreement whereas upon detection of a group change the group control mechanism will initiate the feed of the total cards for a predetermined period and said checking device permitting said analyzer selecting means to control the common printing mechanism by said secondary set of total card analyzing means only if the checking device has determined an agreement between the group designation of the total card and the group designation of the previously analyzed group of item cards.

References Cited in the file of this patent

UNITED STATES PATENTS

| | | |
|---|---|---|
| 1,182,314 | Roberts | May 9, 1916 |
| 1,862,032 | Pierce | June 7, 1932 |
| 1,904,633 | Swanson | Apr. 18, 1933 |
| 2,168,763 | Daly et al. | Aug. 8, 1939 |
| 2,199,541 | Harrison | May 7, 1940 |
| 2,240,562 | Lake | May 6, 1941 |
| 2,335,949 | Lewis et al. | Dec. 7, 1943 |
| 2,344,345 | Elliott | Mar. 14, 1944 |
| 2,359,680 | Roth | Oct. 3, 1944 |
| 2,406,040 | Ryan | Aug. 20, 1946 |